United States Patent
Schelmbauer (10) Patent No.: US 8,953,502 B2
(45) Date of Patent: *Feb. 10, 2015

(54) RECEIVER FOR RECEIVING RF-SIGNALS IN A PLURALITY OF DIFFERENT COMMUNICATION BANDS AND TRANSCEIVER

(71) Applicant: Intel Mobile Communications GmbH, Neubiberg (DE)

(72) Inventor: Werner Schelmbauer, Steyr (AT)

(73) Assignee: Intel Mobile Communications GmbH, Neubiberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/176,221

(22) Filed: Feb. 10, 2014

(65) Prior Publication Data
US 2014/0155016 A1   Jun. 5, 2014

Related U.S. Application Data

(63) Continuation of application No. 13/027,497, filed on Feb. 15, 2011, now Pat. No. 8,649,302.

(51) Int. Cl.
*H04B 1/56* (2006.01)
*H04B 1/16* (2006.01)
*H04B 1/00* (2006.01)

(52) U.S. Cl.
CPC ............ *H04B 1/16* (2013.01); *H04B 1/163* (2013.01); *H04B 1/006* (2013.01)
USPC ............ 370/276; 370/278; 370/279; 455/431

(58) Field of Classification Search
CPC ................................ H04B 1/16; H04B 1/163
USPC .......................................... 370/276, 278, 279
See application file for complete search history.

(56) References Cited

U.S. PATENT DOCUMENTS

| 6,990,357 B2 | 1/2006 | Ellae et al. |
| 7,221,919 B2 | 5/2007 | Takagi |

(Continued)

FOREIGN PATENT DOCUMENTS

| CN | 1868132 A | 11/2006 |
| CN | 101282568 A | 10/2008 |
| CN | 101401480 A | 4/2009 |

OTHER PUBLICATIONS

Guang, et al. "A 3.1-4.8 GHz CMOS Receiver for MB-OFDM UWB." Journal of Semiconductors, vol. 30, No. 1. Jan. 2009. 6 Pages.

(Continued)

*Primary Examiner* — Farah Faroul
(74) *Attorney, Agent, or Firm* — Eschweiler & Associates, LLC (57) ABSTRACT

A receiver for receiving RF-signals in a plurality of different communication bands, each communication band including a receive frequency range and a transmit frequency range includes a plurality of receiving ports, a plurality of input circuits, a first inductor and a second inductor. Each receiving port is configured to receive RF-signals in a receive frequency range of a communication band. Each input circuit is connected to an associated receiving port for processing RF-signals applied to the receiving port. The first inductor is connected to a first group of input circuits and the second inductor is connected to a second group of input circuits, wherein the first group of input circuits and the second group of input circuits are disjunct. The receiving ports associated with the first group of input circuits are configured to receive RF-signals in a first group of communication bands, wherein in the first group of communication bands, none of the transmit frequency ranges overlap with one of the receive frequency ranges. The receiving ports associated with the second group of input circuits are configured to receive RF-signals in a second group of communication bands, wherein in the second group of communication bands, none of the transmit frequency ranges overlaps with one of the receive frequency ranges.

16 Claims, 7 Drawing Sheets

SNEAK PATH

(56) References Cited

U.S. PATENT DOCUMENTS

| | | |
|---|---|---|
| 8,213,867 B2 | 7/2012 | Zhang et al. |
| 8,238,301 B2 | 8/2012 | Qu et al. |
| 2003/0013284 A1* | 1/2003 | Emrick et al. ............... 438/575 |
| 2006/0154636 A1* | 7/2006 | Shah et al. .................. 455/290 |
| 2008/0160950 A1 | 7/2008 | Yang et al. |
| 2008/0298450 A1 | 12/2008 | Zhang et al. |
| 2009/0085668 A1 | 4/2009 | Gao et al. |
| 2010/0135207 A1 | 6/2010 | Qu et al. |
| 2010/0195546 A1 | 8/2010 | Chun et al. |
| 2010/0301948 A1 | 12/2010 | Amrutur et al. |
| 2010/0311378 A1 | 12/2010 | Tasic et al. |
| 2013/0163383 A1 | 6/2013 | Murakami |

OTHER PUBLICATIONS

Notice of Allowance dated Oct. 3, 2013 for U.S. Appl. No. 13/027,497. 25 Pages.

* cited by examiner

FIG 1

SNEAK PATH

RECEIVER FOR RECEIVING RF-SIGNALS IN A PLURALITY OF DIFFERENT COMMUNICATION BANDS AND TRANSCEIVER

REFERENCE TO RELATED APPLICATION

This application is a continuation of U.S. application Ser. No. 13/027,497 filed on Feb. 15, 2011.

FIELD

Embodiments of the present invention create a receiver for receiving RF-signals in a plurality of different communication bands, for example, in a plurality of different mobile communication bands. Further embodiments of the present invention create a transceiver for receiving and transmitting RF-signals in a plurality of different communication bands, for example, in a plurality of different mobile communication bands.

BACKGROUND

Due to the growing numbers of supported bands, modern integrated receivers also provide a growing number of input ports. With the growing number of input ports, the number of needed low noise amplifiers (LNAs) also increases. Due to the so called "sneak path" which can occur in frequency division duplexing (FDD) systems in which a transmit (TX) frequency range of one band is equal, overlap, or is close to a receive (RX) frequency range of another band, e.g. UMTS Band I and UMTS Band II, a sufficient isolation between some input ports can be required.

SUMMARY

Embodiments of the present invention create a receiver for receiving RF-signals in a plurality of different communication bands, each communication band comprising a receive frequency range and a transmit frequency range. The receiver comprises a plurality of receiving ports, each receiving port being configured to receive RF-signals in a receive frequency range of a communication band from the plurality of communication bands. Furthermore, the receiver comprises a plurality of input circuits, each input circuit being connected to an associated receiving port of the plurality of receiving ports for processing RF-signals applied to the receiving port.

Furthermore, the receiver comprises a first inductor and a second inductor. The first inductor is connected to a first group of input circuits from the plurality of input circuits, and the second inductor is connected to a second group of input circuits from the plurality of input circuits, the first group of input circuits and the second group of input circuits being disjunct.

The receiving ports associated with the first group of input circuits are configured to receive RF-signals in a first group of communication bands, wherein in the first group of communication bands, none of the transmit frequency ranges overlaps with one of the receive frequency ranges.

The receiving ports associated with the second group of input circuits are configured to receive RF-signals in a second group of communication bands, wherein in the second group of communication bands, none of the transmit frequency ranges overlaps with one of the receive frequency ranges.

Further embodiments create a transceiver for receiving and transmitting RF-signals in a plurality of different communication bands, each communication band comprising a receive frequency range and a transmit frequency range.

BRIEF DESCRIPTION OF THE DRAWINGS

Embodiments will be described in detail using the accompanying figures, wherein.

Before embodiments are described in detail using the accompanying figures, it is to be pointed out that the same elements and elements with the same function will be provided with the same reference numbers and that a description of elements provided with the same reference numbers is mutually exchangeable. Therefore, a repeated description of elements provided with the same reference numbers is omitted.

DETAILED DESCRIPTION

Figure 1:
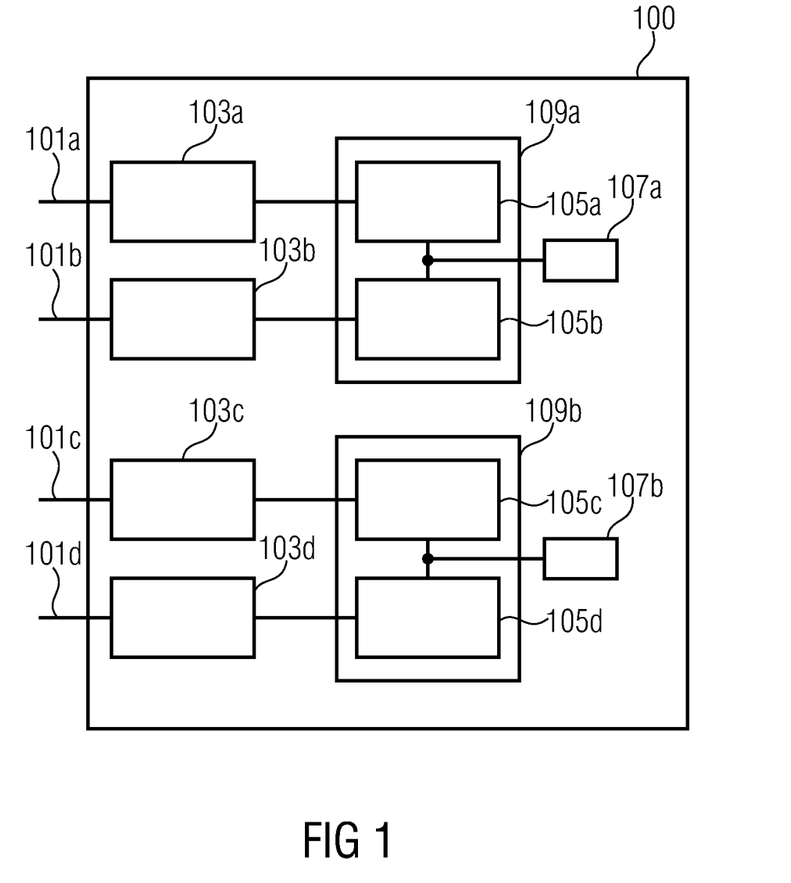
FIG. 1 is a block schematic diagram of a receiver according to an embodiment.

FIG. 1 shows a block schematic diagram of a receiver 100 for receiving RF-signals 101a-101d in a plurality of different communication bands (e.g., in a plurality of different mobile communication bands). Each communication band comprises a receive frequency range and a transmit frequency range.

The receiver 100 comprises a plurality of receiving ports 103a to 103d. Each receiving port 103a to 103d is configured to receive RF-signals 101a to 101d in a receive frequency range of a communication band from the plurality of communication bands.

In the example shown in FIG. 1, a first receiving port 103a is configured to receive RF-signals 101a in a first communication band, a second receiving port 103b is configured to receive RF-signals 101b in a second communication band, a third receiving port 103c is configured to receive RF-signals 101c in a third communication band and a fourth receiving port 103d is configured to receive RF-signals 101d in a fourth communication band.

The receiver 100 further comprises a plurality of input circuits 105a to 105d. Each input circuit 105a to 105d is connected to an associated receiving port 103a to 103d of the plurality of receiving ports 103a to 103d for processing RF-signals 101a to 101d applied to the receiving ports 103a to 103d. In the example shown in FIG. 1, a first input circuit 105a is connected to its associated receiving port 103a for processing the RF-signals 101a in the first communication band. A second input circuit 105b is connected to its associated second receiving port 103b for processing the RF-signals 101b in the second communication band. A third input circuit 105c is connected to its associated receiving port 103c for processing the RF-signals 101c in the third communication band. A fourth input circuit 105d is connected to its associated receiving port 103d for processing the RF-signals 101d in the fourth communication band.

The input circuits 105a to 105d may also be called input stages, and may, for example, comprise active and/or passive elements for processing (e.g., for amplifying) the RF-signals 101a to 101d.

The receiver 100 further comprises a first inductor 107a (e.g., a first degeneration inductor 107a or a first degeneration coil 107a) and a second degeneration inductor 107b (e.g., a second degeneration inductor 107b or a second degeneration coil 107b), wherein the first (degeneration) inductor 107a is connected to a first group 109a of input circuits 105a, 105b from the plurality of input circuits 105a to 105d. The second (degeneration) inductor 107b is connected to a second group 109b of input circuits 105c, 105d from the plurality of input circuits 105a to 105d. The first group 109a of input circuits 105a, 105b and the second group 109b of input circuits 105c, 105d are disjunct. In other words, an input circuit of the plurality of input circuits 105a to 105d being comprised in the first group 109a of input circuits 105a, 105b is not comprised in the second group 109b of input circuits 105c, 105d, and vice versa.

The receiving ports 103a, 103b associated with the first group 109a of input circuits 105a, 105b are configured to receive RF-signals 101a, 101b in a first group of communication bands, wherein in the first group of communication bands, none of the transmit frequency ranges overlaps with one of the receive frequency ranges.

The receiving ports 103c, 103d associated with the second group 109b of input circuits 105c, 105d are configured to receive RF-signals 101c, 101d in a second group of communication bands, wherein in the second group of communication bands, none of the transmit frequency ranges overlaps with one of the receive frequency ranges.

In other words, the communication bands for the receiving ports 103a to 103d are chosen such that input circuits from the plurality of input circuits 105a to 105d being connected to the same (degeneration) inductor do not process RF-signals of communication bands having overlapping transmit frequency ranges and receive frequency ranges.

Transmit frequency ranges and receive frequency ranges of communication bands being shared by input circuits 105a to 105d of different groups 109a, 109b of input circuits 105a to 105d may overlap.

As an example, the first communication band, in which the first receiving port 103a receives the RF-signals 101a, may be the UMTS band I. The third communication band in which the receiving port 103c receives the RF-signals 101c may be the UMTS band II. In this case the transmit frequency range of the first communication band (of the UMTS band I) overlaps with the receive frequency range of the third communication band (of the UMTS band II).

It has been found that this overlap can lead to a sneak path, for example, between a transmit port for the UMTS band I to a receiving port for the UMTS band I (over the receiving port for the UMTS band II) in a transceiver. Such a sneak path is shown in a schematic illustration of a conventional transceiver in FIG. 2.

Figure 2:
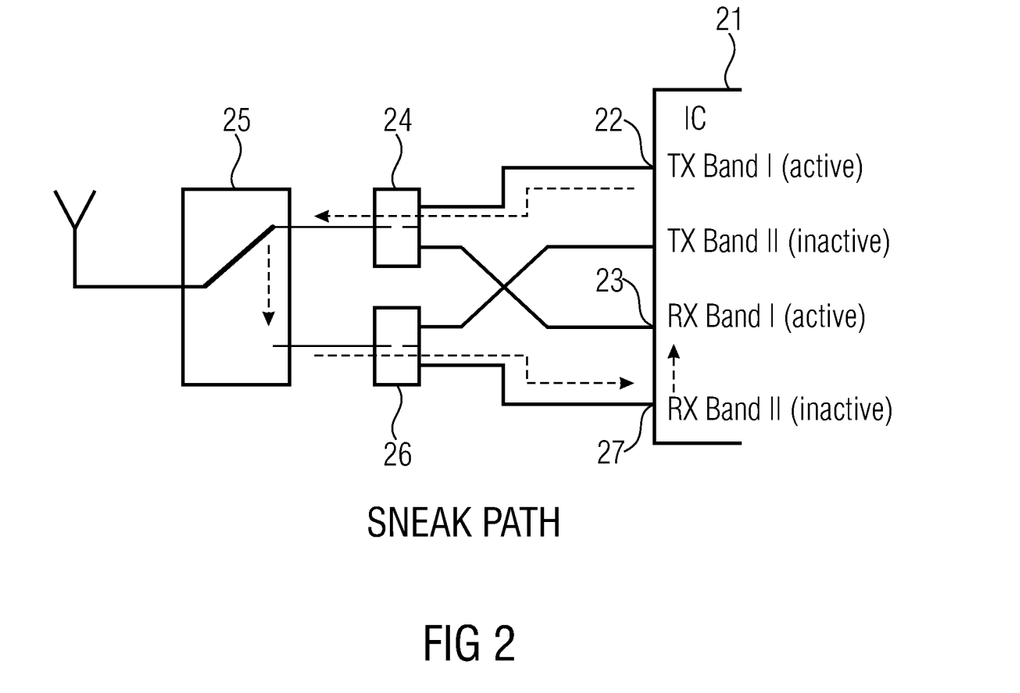
FIG. 2 is a schematic diagram illustrating how a sneak path can occur in a conventional FDD system.

This conventional transceiver comprises a conventional transceiver IC 21. A sneak path between a transmit port 22 for the UMTS band I and a receiving port 23 for the UMTS band I can occur through a first duplexer 24 for the UMTS band I, an antenna switch 25, a second duplexer 26 for the UMTS band II and a receiving port 27 for the UMTS band II. This sneak path occurs because of the overlap between the transmit frequency range of the UMTS band I and the receive frequency range of the UMTS band II, therefore, a bandpass filter in the first duplexer 24 for the transmit frequency range of the UMTS band II has a similar pass band such as a band pass filter in the second duplexer 26 for the receive frequency range of the UMTS band II. To circumvent this sneak path, alternate solutions provide a high isolation between all receiving ports of the transceiver IC 21. This isolation is achieved by having isolated (and separated) low noise amplifiers for each receiving port of the transceiver IC 21. For providing this isolation, every LNA comprises its own degeneration inductor. Unfortunately, due to the use of integrated inductors the chip area consumption is quite large and grows with a number of needed communication bands and, therefore, with the number of needed LNAs.

It has been found that isolation between different receiving ports of a receiver is not needed for every communication band of the receiver. In other words, it has been found that a high isolation between two receiving ports configured for two different communication bands has to be provided only if a transmit frequency of a communication band of a first one of the two receiving ports overlaps with (or is close to) a receive frequency range of a communication band of a second one of the two receiving ports.

The receiver 100 makes use of this finding, by providing the first (degeneration) inductor 107a for the first group 109a of input circuits 105a, 105b, and by providing the second (degeneration) inductor 107b for the second group 109b of input circuits 105c. 105d. The first (degeneration) inductor 107a is therefore shared by input circuits 105a, 105b for which a high isolation in between is not necessary, as transmit frequency ranges and receive frequency ranges of the first group of communication bands do not overlap. As an example, the second communication band, in which the second receiving port 103b may receive the RF-signals 101b, may be the UMTS band III. The transmit frequency range of the UMTS band I does not overlap with the receive frequency range of the UMTS band III and the transmit frequency of the UMTS band III does not overlap with the receive frequency range of the UMTS band I. Therefore, a high isolation between the input circuits 105a, 105b for this communication bands is not needed, as RF-signals in the transmit frequency range of the UMTS band I may not pass the second receiving port 103b (because of its adaption to the receive frequency range of the UMTS band III) and RF-signals in the transmit frequency range of the UMTS band III may not pass the first receiving port 103a (because of its adaption to the receive frequency range of the UMTS band I).

The same applies for the second (degeneration) inductor 107b, which is shared by the second group 109b of input circuits 105c, 105d, processing the RF-signals 101c, 101d in the second group of communication bands in which none of the transmit frequency ranges overlaps with one of the receive frequency ranges. As an example, the fourth communication band in which the fourth receiving port 103d receives the RF-signals 101d may be the UMTS band IV. The transmit frequency range of the UMTS band IV does not overlap with the receive frequency range of the UMTS band II, and the transmit frequency range of the UMTS band II does not overlap the receive frequency range of the UMTS band IV, therefore, no isolation has to be provided between these two UMTS bands. Therefore, the input circuits 105c, 105d processing the RF-signals 101c, 101d, do not need a high isolation therebetween.

By using the shared (degeneration) inductors 107a, 107b for the groups 109a, 109b of input circuit 105a to 105d, a number of overall degeneration inductors in the receiver 100 can be dramatically reduced, which leads to a much lower chip area consumption of the receiver 100.

Using a conventional concept by providing a degeneration inductor for every low noise amplifier (and therefore for every communication band) leads to one degeneration inductor per communication band. In the example shown in FIG. 1, having a receiver with capabilities of receiving RF-signals in four different communication bands, at least four degeneration inductors would be needed. By employing the above-described concept, the receiver 100 shown in FIG. 1 can handle RF-signals in four different communication bands by only having the two (degeneration) inductors 107a, 107b, each (degeneration) inductor 107a, 107b being associated to a group of communication bands, in which none of the transmit frequency ranges overlaps with one of the receive frequency ranges.

According to further embodiments, the concept shown in FIG. 1 may be extended to an arbitrary number of communication bands; therefore, a receiver may comprise an arbitrary number of groups of input circuits, each group of input circuits sharing a common (degeneration) inductor.

Two different communication bands, in which a transmit frequency range of a first of the two different communication bands overlaps a receive frequency range of a second of the two different communication bands would therefore be associated with two different groups of input circuits with a high isolation between these two different groups of input circuits.

According to further embodiments, the groups of communication bands are chosen such, that a minimum gap between each transmit frequency range and each receive frequency range in one group of communication bands is at least 1 MHz, at least 2 MHz, or at least 5 MHz.

In other words, in one communication band, not only may each transmit frequency range be different from each receive frequency range, but there may also be a gap between the transmit frequency ranges and the receive frequency ranges.

According to further embodiments, for each communication band from the plurality of communication bands of the receiver 100, the transmit frequency range may be different from the receive frequency range. In other words, the receiver 100 may be configured to process FDD signals, for example, UMTS signals or LTE signals.

Frequencies of the RF-signals 101a to 101d of the receiver 100 may, for example, range from 700 MHz to 2700 MHz.

In other words, the receive frequency ranges and the transmit frequency ranges of the plurality of communication bands may be in a range from 700 MHz to 2700 MHz.

The input circuits 105a to 105d may, for example, each comprise a first amplifying stage and may be matched in its impedance (by using the (degeneration inductors) 107a to 107b) to the receiving ports 103a to 103d. Possible implementations of the input circuits 105a to 105d will be shown later using FIGS. 4a and 4b, for example.

The (degeneration) inductors 107a, 107b may be implemented as degeneration coils, for example, as integrated degeneration coils on a chip (comprising the receiving ports 103a to 103d and the input circuits 105a to 105b) of the receiver 100, or together with such a chip of the receiver 100 in a common housing. According to further embodiments the degeneration coils may be connected externally to such a chip of the receiver 100.

According to further embodiments the degeneration inductors 107a, 107b may be implemented as chip inductors (e.g. ceramic chip inductors), for example, as integrated chip inductors on a chip (comprising the receiving ports 103a to 103d and the input circuits 105a to 105b) of the receiver 100, or together with such a chip of the receiver 100 in a common housing. According to further embodiments the degeneration chip inductors may be connected externally to such a chip of the receiver 100.

Figure 3:
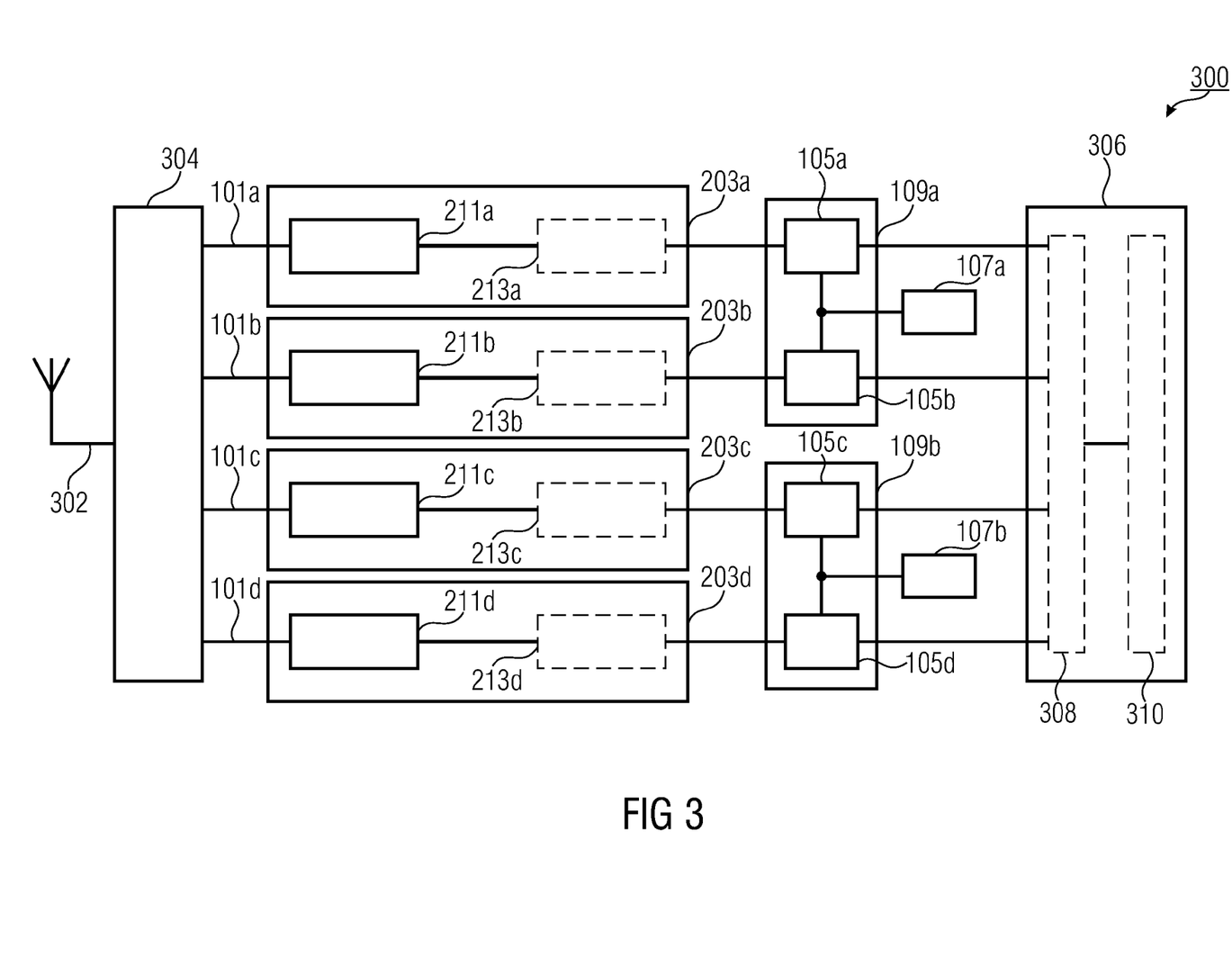
FIG. 3 is a block schematic diagram of a receiver according to a further embodiment connected to an antenna.

FIG. 3 shows a block schematic diagram of a receiver 300 according to a further embodiment. The receiver 300 is connected to an antenna 302. A functionality of the receiver 300 may be similar to a functionality of the receiver 100. The receiver 300 extends the receiver 100 by the optional features shown in FIG. 3 which will be explained in the following. It is understood that further embodiments may comprise only one, or some, of the optional features shown in FIG. 3.

The receiver 300 differs from the receiver 100 in that it further comprises an antenna switch 304 and a signal processing stage 306. Furthermore, each receiving circuit 203a to 203d comprises a filter 211a to 211d and an optional matching network 213a to 213d. A functionality of the receiving ports 203a to 203d may be similar or equal to a functionality of the receiving ports 103a to 103d. Therefore, the receiving ports 203a to 203d may show a possible implementation of the receiving ports 103a to 103d.

A pass band of each filter 211a to 211d (in the following also designated as receive filter 211a to 211d) is adapted to the receive frequency range of the receiving port 203a to 203d, in which the receive filter 211a to 211d is comprised. As an example, a pass band of the first receive filter 211a of the first receiving port 203a is adapted to the RF-signals 101a and therefore to the receive frequency range of the first communication band, such that RF-signals in the receive frequency range of the first communication band can pass the receive filter 211a and RF-signals with a frequency range outside the pass band of the first receiving filter 211a are blocked, or suppressed by the first receive filter 211a.

This, of course, also applies to the receive filters 211b to 211d of the receiving ports 203b to 203d, according to their respective pass bands.

According to further embodiments, the first receive filter 211a may be configured to block, or suppress (e.g. by at least 10 dB), RF-signals in the transmit frequency ranges of the communication bands in the first group communication bands. In other words, the first receive filter 211a may be adapted to a receive frequency range of the first communication band of the first group of communication bands to block or suppress RF-signals in the transmit frequency ranges of the communication bands of the first group of communication bands. The same functionality may apply to the receive filters 211c to 211d, adapted to the receive frequency ranges of the second group of communication bands.

By blocking or suppressing transmit frequency ranges of different communication bands in the same group of communication bands, a sneak path between the first group 109a of input circuits 105a, 105b sharing the same first degeneration inductor 107a is prevented. This same principle applies to the second group of input circuits 105c, 105d.

According to further embodiments, a pass band of a receive filter of a receiving port associated with the first group 109a of input circuits 105a, 105b may overlap with a transmit frequency range of a communication band of the second group of communication bands, and vice versa. As an example, the pass band of the first receive filter 211a, which is adapted to the receive frequency range of the first communication band may overlap with the transmit frequency range of the third communication band. In other words, the first receive filter 211a may not fully block RF-signals in the transmit frequency range of the third communication band, because the receive frequency range of the first communication band overlaps with the transmit frequency range of the third communication band. To circumvent this possible sneak path, the first group 109a of input circuits 105a, 105b and the second group 109b of input circuits 105c, 105d are isolated from each other, by having the separated degeneration inductors 107a, 107b.

The matching networks 213a to 213d are configured to provide a power match for the receiving ports 203a to 203d, for example, by providing a 50 Ohm output to the input circuits 105a to 105d for reducing power losses.

According to further embodiments, the signal processing stage 306 may comprise a cascode amplifier circuit 308. The cascode amplifier circuit 308 may be shared by some, or all, of the input circuits 105a to 105d. In the example shown in FIG. 3, the cascode input circuit 308 is shared by all input circuits 105a to 105d of the receiver 300. Each input stage 105c, 105d may, in conjunction with the cascode amplifier circuit 308, create a low noise amplifier for the RF-signals in its communication bands. It has been found that in a typical receiver being configured to receive RF-signals in a plurality of communication bands at a time typically only one communication band is active, and therefore, typically only one input circuit of the plurality of input circuits 105a to 105d is active. Therefore, the cascode amplifier circuit 308 can be provided as a shared cascode amplifier circuit 308 for all of the input circuits 105a to 105d.

It has been found that an isolation between the different communication bands, after the input circuit 105a to 105d is not necessary, if a sufficient isolation is already provided by the input circuits 105a to 105d, therefore, enabling the use of the shared cascode amplifier circuit 308.

By using the shared cascode amplifier circuit 308, for each of the input circuits 105a to 105d, the chip area consumption of the receiver 300 can be dramatically reduced, especially when compared to receivers, in which for each communication band one dedicated low noise amplifier (comprising an input circuit and a cascode amplifier circuit) is provided. A possible implementation of the input circuit 105a to 105d sharing the common cascode amplifier circuit 308 will be explained later in conjunction with FIG. 4b.

According to further embodiments, the signal processing stage 306 may comprise a cascode amplifier circuit for each group of input circuits, for example, a cascode amplifier circuit for the first group 109a of input circuits 105a, 105b and another cascode amplifier circuit for the second group 109b of input circuits 105c, 105d.

According to further embodiments, the signal processing stage may comprise a cascode amplifier circuit for each input circuit 105a to 105d.

The signal processing stage 306 may further comprise a signal conditioning and evaluation stage 310, for example, comprising a processor for evaluating the received RF-signals. The processor may be configured to process frequency division duplexing RF-signals, for example, UMTS or LTE RF-signals.

Figure 4A:
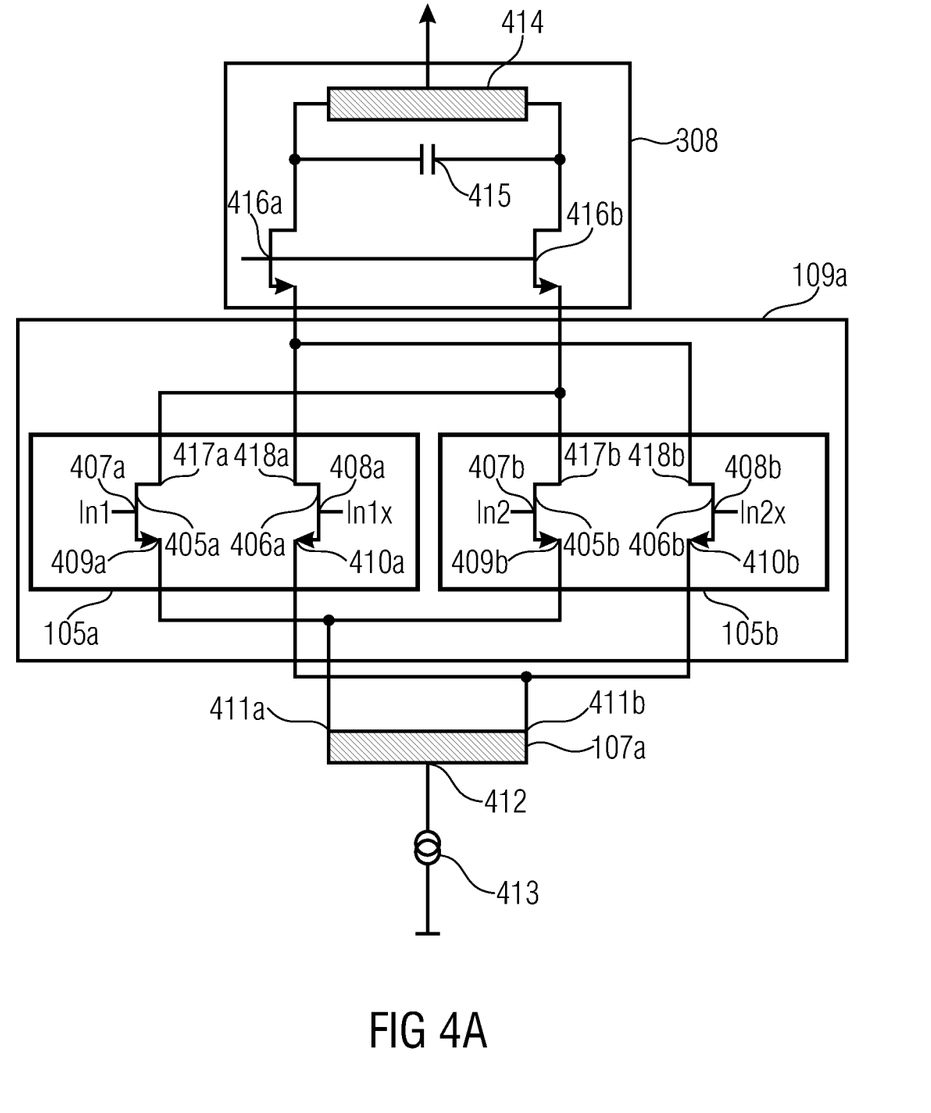
FIG. 4a is a schematic diagram illustrating a possible implementation for two input circuits connected to a common degeneration inductor.

FIG. 4a shows a possible implementation of the first group 109a of input circuits 105a, 105b, being connected to the first degeneration inductor 107a according to one embodiment.

An implementation of the second group 109b of input circuit 105c, 105d may be similar or equal, thus a detailed description of the implementation of the second group 109b of input circuits 105c, 105d is omitted.

The first input circuit 105a comprises a first differential input stage comprising a first pair of input transistors 405a, 406a. The second input circuit 105b comprises a second differential input stage comprising a second pair of transistors 405b, 406b. The differential input stage of the first input circuit 105a is configured to receive the RF-signals 101a as differential signals. The second differential stage of the second input circuit 105b is configured to receive the RF-signals 101b as differential input signals. A first receiving port (e.g., the first receiving port 103a or the first receiving port 203a) can be connected to gate terminals 407a, 408a of the first pair of input transistors 405a, 406a. A second receiving port (e.g., the second receiving port 103b or the second receiving port 203b) may be connected to gate terminals 407b, 408b of the second pair of input transistors 405b, 406b.

The first differential stage of the first input circuit 105a and the second differential stage of the second input circuit 105b are connected to the (shared) first degeneration inductor 107a.

In more detail, a source terminal 409a of a first input transistor 405a of the first pair of input transistors and a source terminal 409b of a first input transistor 405b of the second pair of input transistors are connected to a first terminal 411a of the first degeneration inductor 107a. A source terminal 410a of a second input transistor 406a of the first pair of input transistors and a source terminal 410b of a second input transistor 406b of the second pair of input transistors are connected to a second terminal 411b of the first degeneration inductor 107a. The first degeneration inductor 107a is used for providing a real valued impedance at the gate terminals 407a, 408a, 407b, 408b of the input transistors 405a, 406a, 405b, 406b. In other words, the degeneration inductor 107a is shared by the differential input stage of the first input circuit 105a, and the differential input stage of the second input circuit 105b, the first input circuit 105a and the second input circuit 105b being configured for processing RF-signals in two different communication bands.

The first degeneration inductor 107a (or the first degeneration coil 107a) comprises a center tap 412. In the example shown in FIG. 4a, the center tap 412 is connected to a current source 413 for biasing the source terminals 409a, 410a, 409b, 410b of the transistors 405a, 406a, 405b, 406b. According to further embodiments, instead of being connected to the current source 413, the center tap 412 may be connected to a power supply terminal or a ground terminal of a receiver in which the input circuits 105a, 105b are used.

Furthermore, the input circuits 105a, 105b are connected to a cascode amplifier circuit 308. The cascode amplifier circuit 308 as is shown in FIG. 4a may be one possible implementation of the cascode amplifier 308, as shown in a schematic illustration in FIG. 3. The cascode amplifier circuit 308 comprises a resonance circuit comprising a load inductor or tank 414 together with a resonance capacitor 415. Furthermore, the cascode amplifier circuit 308 comprises a differential amplifying stage comprising a first amplifier transistor 416a and a second amplifier transistor 416b. As previously described, it has been found that typically one communication band is active at a time, which enables the use of the cascode amplifier circuit 308 for the first input circuit 105a for processing RF-signals in the first communication band and for the second input circuit 105b for processing RF signals in the second communication band. To be more precise, a drain terminal 417a of the first input transistor 405a of the first pair of input transistors and a drain terminal 417b of the first input transistor 405b of the second pair of input transistors are connected to a second amplifier transistor 416b of the pair of amplifier transistors of the cascode amplifier circuit 308. A drain terminal 418a of the second input transistor 406a of the first pair of input transistors and a drain terminal 418b of the second input transistor 406b of the second pair of input transistors are connected to a first amplifier transistor 416a of the cascode amplifier circuit 308.

As mentioned before, typically only one communication band is active at a time, therefore, also only one input circuit of the two input circuits 105a, 105b is active at a time. Thus, if one input circuit of the two input circuits 105a, 105b is active, the other input circuit is inactive. The input transistors of the active input circuit then form together with the amplifier transistors 416a, 416b a low noise amplifier for RF-signals in the communication band of the active input circuit. In other words, FIG. 4a shows a low noise amplifier with a shared degeneration coil 107a or degeneration inductor 107a. Typically, the requirement that a sufficient isolation between some input ports (or receive ports) is required, disables the common usage of degeneration coils in the low noise amplifier, as it is shown in FIG. 4a. But with the receiver according to embodiments (e.g., the receiver 100 or receiver 300), this problem is solved by providing low noise amplifiers with shared degeneration coils for those groups of communication bands (e.g., for the first group of communication bands and the second group of communication bands) in which none of the transmit frequency ranges overlap with one of the receive frequency ranges.

In other words, embodiments enable the common usage of degeneration coils (or degeneration inductors) by keeping the required isolation.

In other words, embodiments distinguish between input ports (receive ports) with high isolation and input ports (receive ports) with low isolation. "Sneak path" critical bands are connected to input ports with high isolation therebetween. For all other bands LNAs with shared degeneration coils (the degeneration coils 107a, 107b) can be used and therefore a reduction of chip area is possible (can be achieved).

Figure 4B:
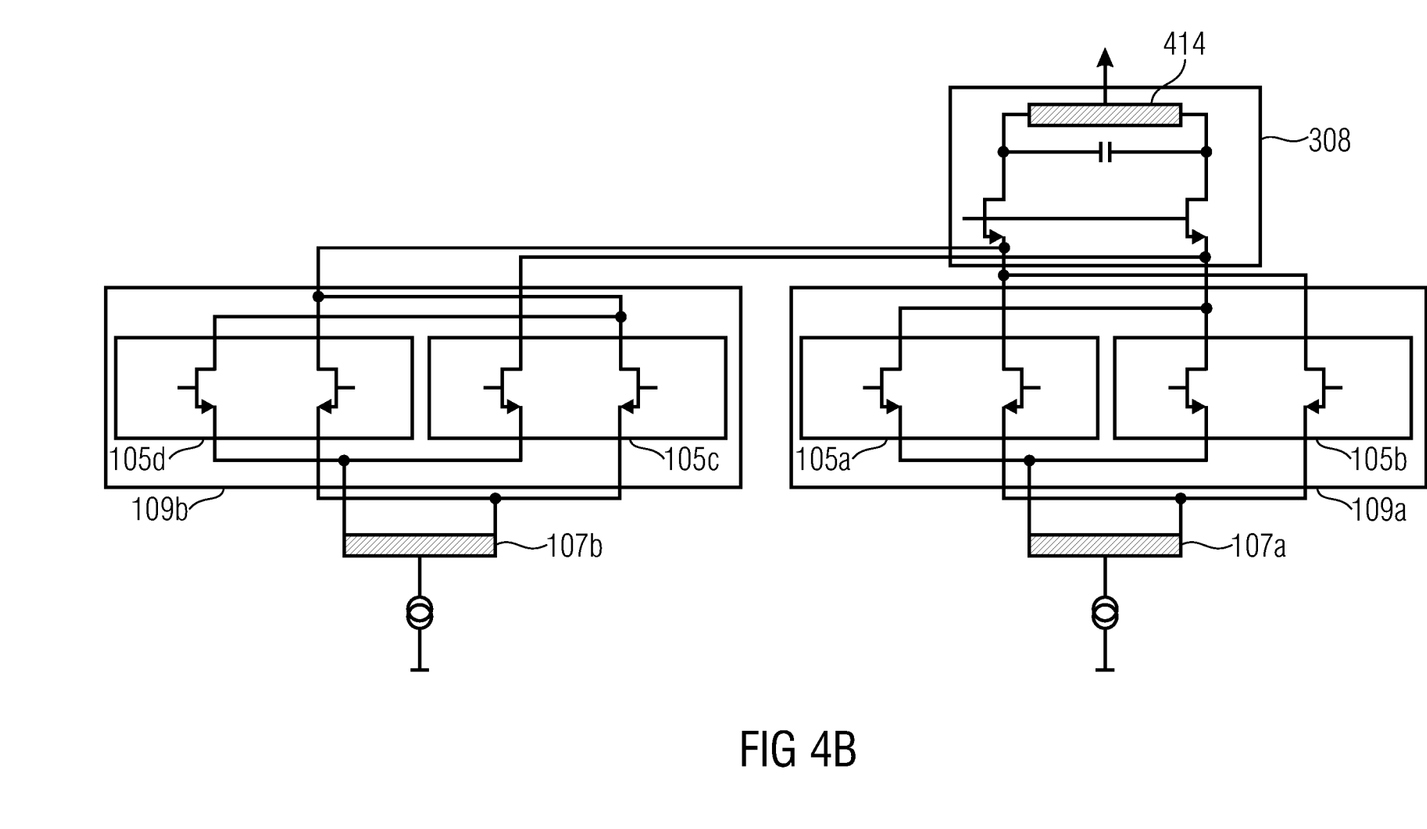
FIG. 4b is a schematic diagram illustrating a possible implementation of a first pair of input circuits sharing a first degeneration inductor and a second pair of input circuits sharing a second degeneration inductor, the first pair of input circuits and the second pair of input circuits sharing a common cascode amplifier circuit.

FIG. 4b shows as an extension to FIG. 4a, a possible implementation of the second group 109b of input circuits 105c, 105d. It is also shown how the two different groups 109a, 109b of input circuits can be connected to the (shared) cascode amplifier circuit 308 according to one embodiment. From FIG. 4b, it can be seen that it is possible to implement a receiver capable of handling a plurality of communication bands with a plurality of input circuits 105a to 105d, each input circuit being configured to process RF-signals in one of the communication bands, from the plurality of communication bands, but sharing one common cascode amplifier circuit 308.

Embodiments achieve a chip area reduction not only by sharing degeneration inductors, by groups of communication bands, but also by sharing a cascode amplifier circuit 308 for groups of communication bands or for all communication bands the receiver can handle (as shown in FIG. 4b). Especially the chip area consuming load inductor 414 is therefore only needed once for all communication bands of the receiver according to one embodiment.

Although the transistors used in the embodiments shown in FIG. 4a, FIG. 4b are field-effect transistors, it is understood that, according to further embodiments, one, some, or all of this transistors may be substituted with transistors of other types (e.g., bipolar transistors).

Figure 5:
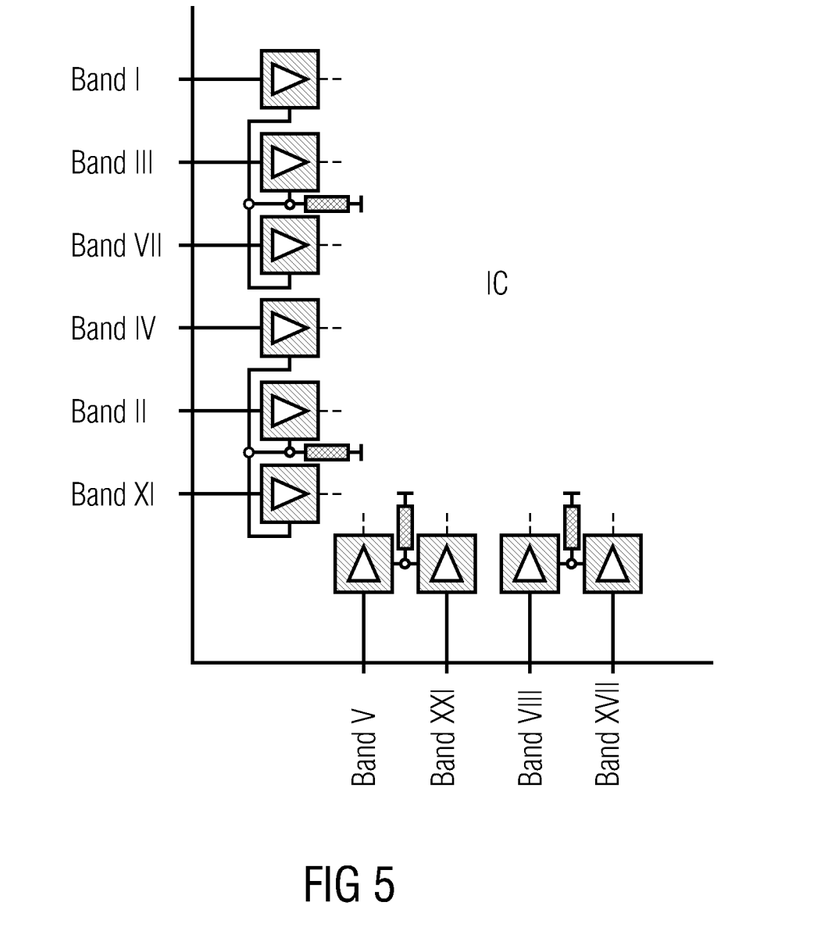
FIG. 5 is a schematic diagram illustrating a receiver according to an embodiment being configured to receive RF-signals in ten different communication bands.

FIG. 5 shows a schematic illustration of a receiver providing a plurality of communication bands, and providing well isolated inputs just for "sneak paths" critical bands. The receiver shown in FIG. 5 provides the UMTS bands I, II, III, IV, V, VII, VIII, XI, XVII, and XXI. "Sneak path" critical bands for this configuration are, for example, band I and II, band II and III, band V and VIII. Especially compared to a chip implementation in which a degeneration inductor is provided for each communication band, the receiver can handle (in which ten separated degeneration coils would be needed) a dramatic reduction can be achieved with embodiments. The receiver shown in FIG. 5 provides isolated inputs (just) for the band combinations mentioned above. Therefore, the number of degeneration coils can be reduced down to four. Assuming an average coil diameter of 300 mm, a chip area reduction of 0.42 mm$^2$ is achieved (when compared to the concept of providing a degeneration inductor or degeneration coil for each communication band of the receiver).

Figure 6:
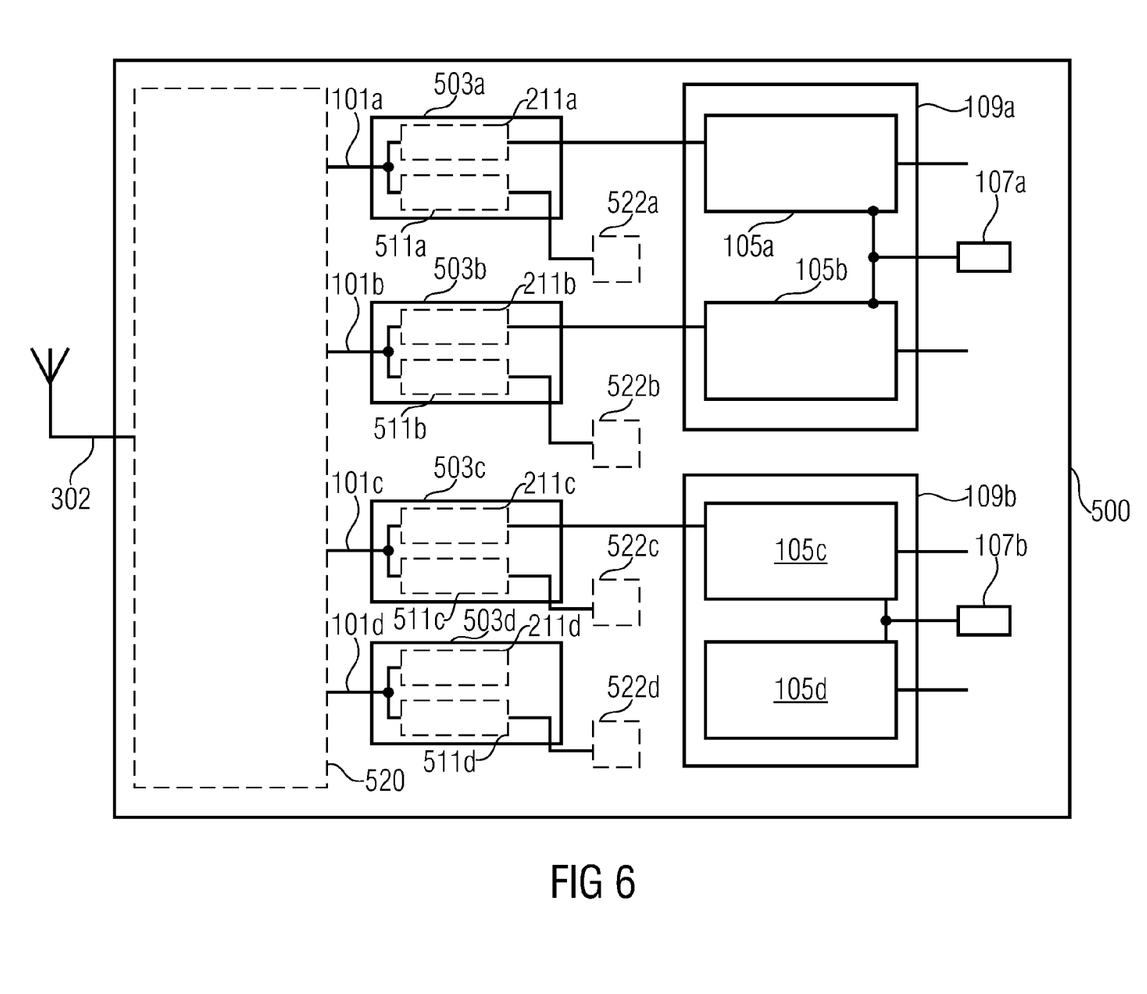
FIG. 6 is a block schematic diagram illustrating a transceiver according to an embodiment.

FIG. 6 shows a block schematic diagram of a receiver 500 connected to an antenna 302.

The transceiver 500 is configured to receive and transmit RF-signals 101a to 101d in a plurality of different communication bands. Each communication band comprises a receive frequency range and a transmit frequency range.

The transceiver 500 may incorporate a receiver according to embodiments (e.g., the receiver 100 or the receiver 300).

The transceiver 500 comprises a plurality of duplexers 503a to 503d. Each duplexer 503a to 503d is configured to receive RF-signals 101a to 101d in a receive frequency range of a communication band from the plurality of communication bands and to transmit RF-signals 101a to 101d in a transmit frequency range of the communication bands. In other words, each duplexer 503a to 503d is associated with one communication band of the plurality of communication bands.

The transceiver 500 further comprises a plurality of input circuits 105a to 105d. Each input circuit is connected to an associated duplexer of the plurality of duplexers 503a to 503d for processing RF-signals 101a to 101d applied to the duplexer 503a to 503d. As an example, a first input circuit 105a is connected to a first duplexer 503a for processing RF-signals 101a in a first communication band. The same applies for the other input circuits 105b to 105d.

The transceiver 500 further comprises a first inductor 107a (e.g. a first degeneration inductor 107a or a first degeneration coil 107a) and a second inductor 107b (e.g. a second degeneration inductor 107b or a second degeneration coil 107b). The first (degeneration) inductor 107a is connected to a first group 109a of input circuits 105a, 105b from the plurality of input circuits 105a to 105d. The second (degeneration) inductor 107b is connected to a second group 109b of input circuits 105c, 105d from the plurality of input circuits 105a to 105d. The first group 109a of input circuits 105a, 105b and the second group 109b of input circuits 105a, 105b being disjunct.

The duplexers 503a, 503b associated to the first group 109a of input circuits 105a, 105b are configured to receive RF-signals 101a, 101b in a first group of communication bands, wherein in the first group of communication bands, none of the transmit frequency ranges overlaps with one of the receive frequency ranges. The duplexer 503c, 503d associated to the second group 109b of input circuits 105c, 105d are configured to receive RF-signals 101c, 101d in a second group of communication bands, wherein in the second group of communication bands, none of the transmit frequency ranges overlap with one of the receive frequency ranges.

It can be seen that the transceiver 500 differs from the receiver 100 in that it is further configured to transmit RF-signals in the plurality of communication bands. Therefore, the receive ports 103a to 103d are comprised in (or are part of) the duplexers 503a to 503d. Therefore, an implementation of the receive part of the transceiver 500 (including the parts of the duplexers 503a to 503d being configured to receive the RF-signals 101a to 101d and including the input circuits 105a to 105d) can be implemented as it has been described above with the receivers 100, 300.

According to further embodiments, each duplexer 503a to 503d may comprise a receive filter, a pass band of which is adapted to the receive frequency range of the communication band of the duplexer 503a to 503d. Furthermore, each duplexer 503a to 503d may comprise a transmit filter, a pass band of which is adapted to a transmit frequency range of the communication band of the duplexer 503a to 503d.

As an example, the first duplexer 503a may comprise a first receive filter 211a, a pass band of which is adapted to the receive frequency range of the first communication band and a first transmit filter 511a, a pass band of which is adapted to the transmit frequency range of the first communication band.

The receive filters 211a, 211b of the duplexers 503a, 503b being configured to receive RF-signals in the first group of communication bands are configured to block or suppress (by at least 10 dB) RF-signals in the transmit frequency ranges of the communication bands of the first group of communication bands. This may apply vice versa for the receive filters 211c, 211d.

The transceiver 500 may further comprise an antenna switch 520 comprising an antenna terminal for connecting to the antenna 302, and comprising duplexer terminals for connecting to the plurality of duplexers 503a to 503d. The antenna switch 520 is configured to selectively connect a duplexer 503a to 503d from the plurality of duplexers 503a to 503d to the antenna terminal (and therefore to the antenna 302).

In other words, the antenna switch 520 is configured to selectively activate one communication band of the plurality of communication bands.

Furthermore, the transceiver 500 may comprise signal generators 522a to 522d, wherein each signal generator 522a to 522d is connected to one duplexer 503a to 503d of the plurality of duplexers 503a to 503d for generating RF-signals in a transmit frequency range of the communication band of the duplexer.

In the following, some aspects of embodiments shall be summarized.

Embodiments enable a shared usage of LNA degeneration coils in multi-band receivers.

It has been found that the most current efficient LNA topology is an inductive degenerated LNA with a tank on top. Unfortunately, due to the use of integrated conductors the chip area of such an LNA is quite large. Therefore, an implementation of such an LNA for each communication band has a very high chip area consumption. Embodiments according to the invention enable the use of such inductive degenerated LNAs with a tank on top (such as that which has been shown in FIG. 4b) with a low chip area consumption, by providing a high isolation between different LNAs for different communication bands only for "sneak paths" critical bands.

Embodiments of the invention enable the common usage of degeneration coils in LNAs by providing shared degeneration coils or degeneration inductors for input circuits processing RF-signals in communication bands in which none of the transmit frequency ranges overlap with one of the receive frequency ranges. Different communication bands which have overlapping transmit frequency ranges and receive frequency ranges are provided with different (separated) degeneration coils for providing a high isolation between these communication bands.

The invention claimed is:

1. A receiver, comprising:
   first and second receiving ports, each receiving port configured to receive RF-signals in a respective receive frequency range of a communication band that comprises a receive frequency range and a transmit frequency range;
   first and second input circuits connected to the first and second receiving ports, respectively, and configured to process RF-signals applied to the respective receiving port;
   a first inductor connected to the first input circuit;
   a second inductor connected to the second input circuit; and
   a shared cascode amplifier circuit connected to the first and second input circuits,
   wherein the first inductor and the second inductor are the same inductor shared between the first and second inputs circuits, and
   wherein the receive frequency range of the first receiving port and the transmit frequency range of the second receiving port do not overlap.

2. The receiver of claim 1, wherein each of the first and second input circuits comprise a differential input stage configured to process the RF-signals applied thereto as a differential signal.

3. The receiver of claim 2, wherein each differential input stage comprises a pair of input transistors connected to the respective inductor and to the shared cascade amplifier circuit.

4. The receiver of claim 3, wherein a first terminal of each pair of input transistors is connected to the respective inductor, a second terminal of each pair of input transistors is connected to the shared cascode amplifier circuit, and a control terminal of each pair of input transistors is configured to receive a respective one of the differential signal.

5. The receiver of claim 3, wherein the shared cascade amplifier comprises a resonance circuit comprising a load inductor and a resonance capacitor.

6. The receiver of claim 5, wherein the load inductor and the resonance capacitor are coupled together in parallel at a first terminal and a second terminal, respectively, and further comprising a pair of amplifying transistors connected between the first and second terminals of the resonant circuit and the pair of input transistors, respectively.

7. A transceiver, comprising:
   first and second duplexers, each duplexer configured to receive RF-signals in a receive frequency range of a communication band and transmit RF-signals in a transmit frequency range of the communication band;
   first and second input circuits connected to first and second duplexers, respectively, the input circuits configured to process RF-signals applied to the duplexers;
   a first inductor connected to the first and second input circuits; and
   a shared cascode amplifier circuit connected to the first and second input circuits,
   wherein the receive frequency range of the first duplexer and the transmit frequency range of the second duplexer do not overlap.

8. The transceiver of claim 7, wherein the first inductor comprises a first degeneration inductor.

9. The transceiver of claim 8, wherein the first and second duplexers each comprise a respective transmit filter comprising a pass band configured to pass the transmit frequency range of the communication band of the respective duplexer, and wherein the first and second duplexers further comprise a respective receive filter comprising a pass band configured to pass the receive frequency range of the communication band of the respective duplexer.

10. The transceiver of claim 7, further comprising an antenna switch, comprising an antenna terminal for connecting to an antenna, wherein the antenna switch is configured to selectively connect the first and second duplexers to the antenna terminal.

11. The receiver of claim 7, wherein each of the first and second input circuits comprise a differential input stage configured to process the RF-signals applied thereto as a differential signal.

12. The receiver of claim 11, wherein each differential input stage comprises a pair of input transistors connected to the respective inductor and to the shared cascade amplifier circuit.

13. The receiver of claim 12, wherein a first terminal of each pair of input transistors is connected to the respective inductor, a second terminal of each pair of input transistors is connected to the shared cascode amplifier circuit, and a control terminal of each pair of input transistors is configured to receive a respective one of the differential signal.

14. The receiver of claim 12, wherein the shared cascade amplifier comprises a resonance circuit comprising a load inductor and a resonance capacitor.

15. The receiver of claim 14, wherein the load inductor and the resonance capacitor are coupled together in parallel at a first terminal and a second terminal, respectively, and further comprising a pair of amplifying transistors connected between the first and second terminals of the resonant circuit and the pair of input transistors, respectively.

16. A receiver, comprising:
first and second receiving ports, each receiving port configured to receive RF-signals in a respective receive frequency range of a communication band that comprises a receive frequency range and a transmit frequency range;
first and second input circuits connected to the first and second receiving ports, respectively, and configured to process RF-signals applied to the respective receiving port;
a first inductor coupled to and shared between the first and second input circuits; and
a shared cascode amplifier circuit connected to the first and second input circuits,
wherein the receive frequency range of the first receiving port and the transmit frequency range of the second receiving port do not overlap.

* * * * *

UNITED STATES PATENT AND TRADEMARK OFFICE
CERTIFICATE OF CORRECTION

PATENT NO.        : 8,953,502 B2                                    Page 1 of 1
APPLICATION NO.   : 14/176221
DATED             : February 10, 2015
INVENTOR(S)       : Werner Schelmbauer It is certified that error appears in the above-identified patent and that said Letters Patent is hereby corrected as shown below:

In the Claims,

Column 12, Claim 3, Line 26 Please replace "...shared cascade amplifier..."
with --...shared cascode amplifier...--

Column 12, Claim 5, Line 34 Please replace "...shared cascade"
with --...shared cascode--

Column 13, Claim 12, Line 12 Please replace "...shared cascade amplifier..."
with --...shared cascode amplifier...--

Column 13, Claim 14, Line 20 Please replace "...shared cascade"
with --...shared cascode--

Signed and Sealed this
Twelfth Day of May, 2015

Michelle K. Lee
*Director of the United States Patent and Trademark Office*